US012573430B2

(12) United States Patent　　　　　(10) Patent No.:　US 12,573,430 B2

Nance et al.　　　　　　　　　　　　(45) Date of Patent:　　Mar. 10, 2026

(54) INTERACTIVE VIDEO ACCESSIBILITY COMPLIANCE SYSTEMS AND METHODS

(71) Applicant: State Farm Mutual Automobile Insurance Company, Bloomington, IL (US)

(72) Inventors: Nathan P. Nance, Chandler, AZ (US); Jonathan K. Hamilton, Johns Creek, GA (US)

(73) Assignee: State Farm Mutual Automobile Insurance Company, Bloomington, IL (US)

( * ) Notice:　Subject to any disclaimer, the term of this patent is extended or adjusted under 35 U.S.C. 154(b) by 809 days.

(21) Appl. No.: 17/233,168

(22) Filed:　Apr. 16, 2021

(65)　　　Prior Publication Data

US 2024/0233774 A1　　Jul. 11, 2024

(51) Int. Cl.
| | |
|---|---|
| *G11B 27/036* | (2006.01) |
| *G06N 3/08* | (2023.01) |
| *G09B 7/02* | (2006.01) |
| *G09B 7/06* | (2006.01) |
| *G09B 21/00* | (2006.01) |
| *G11B 27/34* | (2006.01) |

(52) U.S. Cl.
CPC ............. *G11B 27/036* (2013.01); *G06N 3/08* (2013.01); *G09B 7/02* (2013.01); *G09B 7/06* (2013.01); *G09B 21/007* (2013.01); *G11B 27/34* (2013.01)

(58) Field of Classification Search
None
See application file for complete search history.

(56)　　　　　References Cited

U.S. PATENT DOCUMENTS

| | | | |
|---|---|---|---|
| 8,385,813 | B2 | 2/2013 | Rao |
| 8,714,987 | B2 | 5/2014 | Cohen |
| 10,972,584 | B2 | 4/2021 | McNulty |
| 10,979,761 | B2 | 4/2021 | Sekar et al. |
| 2007/0276729 | A1 | 11/2007 | Freer |
| 2014/0068432 | A1* | 3/2014 | Kucharz .............. G06Q 10/107 |
| | | | 715/716 |
| 2014/0087349 | A1 | 3/2014 | Kitch et al. |
| 2018/0197433 | A1* | 7/2018 | Tavares ................ G09B 21/007 |

(Continued)

OTHER PUBLICATIONS

C., Laura, "How to Make Your Video Interactive", Internet Article, dated Jun. 29, 2018, Lemonlight, 9 pages, accessed online at URL: https://www.lemonlight.com/blog/how-to-make-your-video-interactive/.

*Primary Examiner* — Daniel T Tekle

(74) *Attorney, Agent, or Firm* — Armstrong Teasdale LLP

(57)　　　　　ABSTRACT

Provided herein is a computing system including a processor in communication with at least one memory. The processor is configured to (i) receive a video executable file, (ii) identify one or more interactive elements in the video executable file by scanning the video executable file, (iii) prompt a user to input at least one response option for each identified interactive element, (iv) convert the at least one response option into an executable code snippet, (v) create an enhanced video executable file by embedding the executable code snippet of each respective interactive element into the video executable file for execution at a designated time, and (vi) store the enhanced video executable file to be accessible by a viewer device, wherein the video executable file is executed by the viewer device.

20 Claims, 8 Drawing Sheets

(56)     References Cited

U.S. PATENT DOCUMENTS

| | | | |
|---|---|---|---|
| 2019/0174191 | A1 | 6/2019 | Abbas et al. |
| 2020/0014980 | A1* | 1/2020 | Andrews, II .......... G06F 3/0482 |
| 2020/0314476 | A1 | 10/2020 | Regis et al. |

\* cited by examiner

① Load project files

② Load video file

③ Enter proper labels for each hotspot

| Item # | Start Time | Duration | Jump To | ARIA label value |
|---|---|---|---|---|
| 1 | 2:22 | 8.87 s | 2:33 | Agree |
| 2 | 2:22 | 8.87 s | 3:15 | Disagree |
| 3 | 2:22 | 8.87 s | 3:47 | Ask for more info |
| 4 | 3:12 | 2.3 s | 2:22 | Try again |
| 5 | 3:45 | 1.6 s | 2:22 | Try another option |
| 6 | 4:29 | 8.04 s | 2:22 | Return to Question 1 |

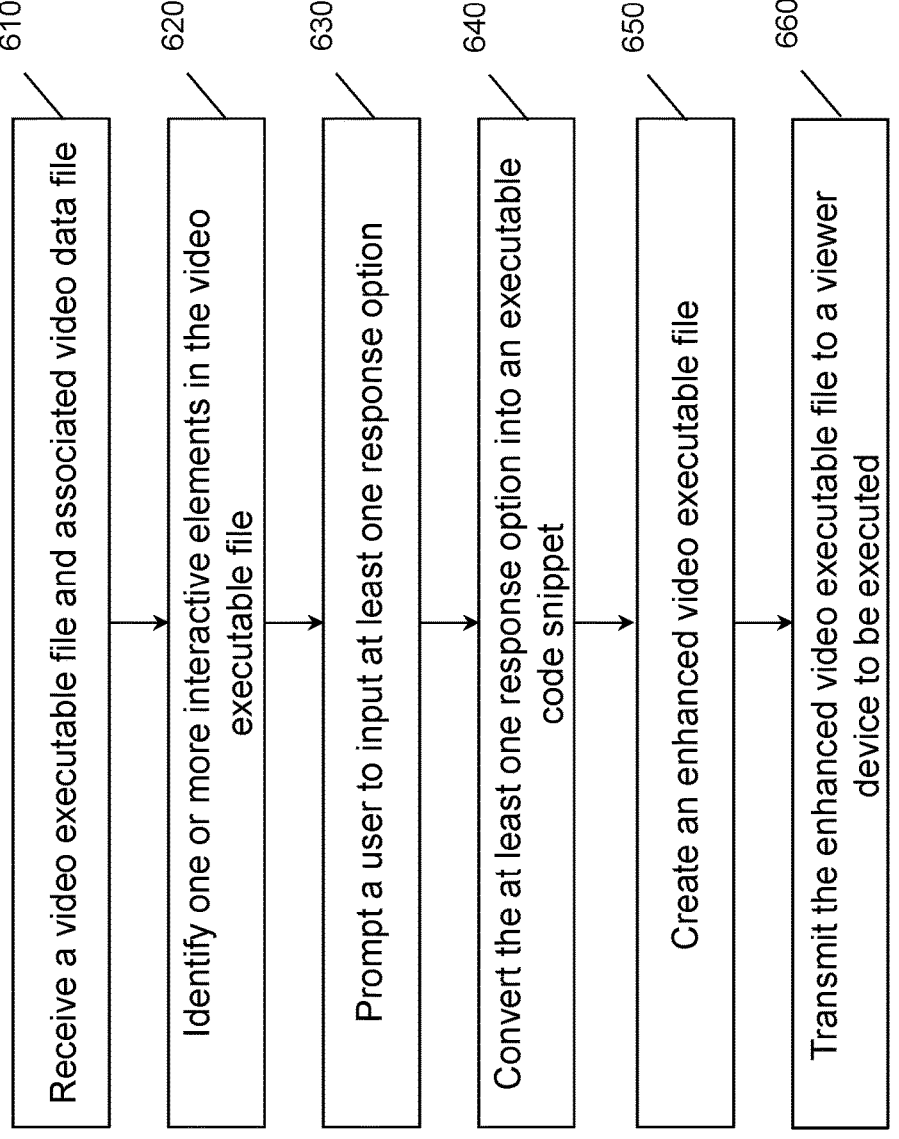

610 Receive a video executable file and associated video data file

620 Identify one or more interactive elements in the video executable file

630 Prompt a user to input at least one response option

640 Convert the at least one response option into an executable code snippet

650 Create an enhanced video executable file

660 Transmit the enhanced video executable file to a viewer device to be executed

Figure 6

INTERACTIVE VIDEO ACCESSIBILITY COMPLIANCE SYSTEMS AND METHODS

FIELD OF THE DISCLOSURE

The present disclosure relates to systems and methods for generating interactive videos with embedded code for accessibility compliance, and more specifically, to systems and methods for analyzing an interactive video file, identifying where in the video file interactive hotspots are located, and embedding computer code within the video file to generate an enhanced video file that, when executed, displays a video that is more fully accessible to individuals with certain physical limitations.

BACKGROUND

Interactive videos may be used by companies, organizations, or other groups of people for training or other purposes. For example, a company may use interactive videos to train its employees on certain topics. The interactive videos may provide certain information (e.g., training information) on a particular topic to the employees, and, after providing the information, the video may display questions pertaining to the information that the employees are prompted to answer to help ensure that the employees understand the information being provided. If an employee answers the questions correctly, then the information has been properly conveyed to that employee. If the employee does not answer the questions properly, then additional information may be provided to help that employee better understand the information being provided. These interactive videos are helpful in conveying certain information to employees.

In many cases, interactive videos that are used by companies to provide information, such as training information, to its employees need to comply with certain content accessibility guidelines. For example, if an interactive video includes a prompt for a user/employee to answer a multiple choice question, that prompt may need to include additional language and/or formatting such that the prompt can be read by a screen reader that is used by users/employees who are blind or otherwise visually impaired. At least one guideline that addresses these accessibility compliance issues is the Web Content Accessibility Guidelines (WCAG 2.0). In some known interactive video systems, adding accessibility features usually requires a developer familiar with the compliance rules to manually input code for the interactive element. Accordingly, the current systems for generating accessible videos are extremely time consuming and expensive to create. A system is needed that can automatically identify interactive hotspots within a video file, and embed computer code within the video file to generate an enhanced video file that, when executed, displays a video and interacts with a screen reader device that causes the interactive questions displayed on the screen to also be converted to audio so that a visually impaired person is able to hear the questions and provide answers to them.

BRIEF SUMMARY

The present embodiments relate to systems and methods for generating accessible videos for users.

In one aspect, a computing system including a processor in communication with at least one memory may be provided. The processor may be configured to: (i) receive a video executable file, (ii) identify one or more interactive elements in the video executable file by scanning the video executable file, (iii) prompt a user to input at least one response option for each identified interactive element, (iv) convert the at least one response option into an executable code snippet, (v) create an enhanced video executable file by embedding the executable code snippet of each respective interactive element into the video executable file for execution at a designated time, and (vi) store the enhanced video executable file to be accessible by a viewer device, wherein the video executable file is executed by the viewer device. The computer system may include additional, less, or alternate functionality, including that discussed elsewhere herein.

In another aspect, a computer-implemented method implemented by a computing system including a processor in communication with at least one memory may be provided. The method may include: (i) receiving a video executable file, (ii) identifying one or more interactive elements in the video executable file by scanning the video executable file, (iii) prompting a user to input at least one response option for each identified interactive element, (iv) converting the at least one response option into an executable code snippet, (v) creating an enhanced video executable file by embedding the executable code snippet of each respective interactive element into the video executable file for execution at a designated time, and (vi) storing the enhanced video executable file to be accessible by a viewer device, wherein the video executable file is executed by the viewer device. The method may include additional, less, or alternate actions, including those discussed elsewhere herein.

In yet another aspect, at least one non-transitory computer-readable storage media having computer-executable instructions embodied thereon may be provided. When executed by at least one processor in communication with at least one memory device, the computer-executable instructions may cause the processor to: (i) receive a video executable file, (ii) identify one or more interactive elements in the video executable file by scanning the video executable file, (iii) prompt a user to input at least one response option for each identified interactive element, (iv) convert the at least one response option into an executable code snippet, (v) create an enhanced video executable file by embedding the executable code snippet of each respective interactive element into the video executable file for execution at a designated time, and (vi) store the enhanced video executable file to be accessible by a viewer device, wherein the video executable file is executed by the viewer device. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 6 illustrates a flow chart of an exemplary computer-implemented process that may be carried out by the exemplary computer system shown in FIG. 1.

Figure 1:
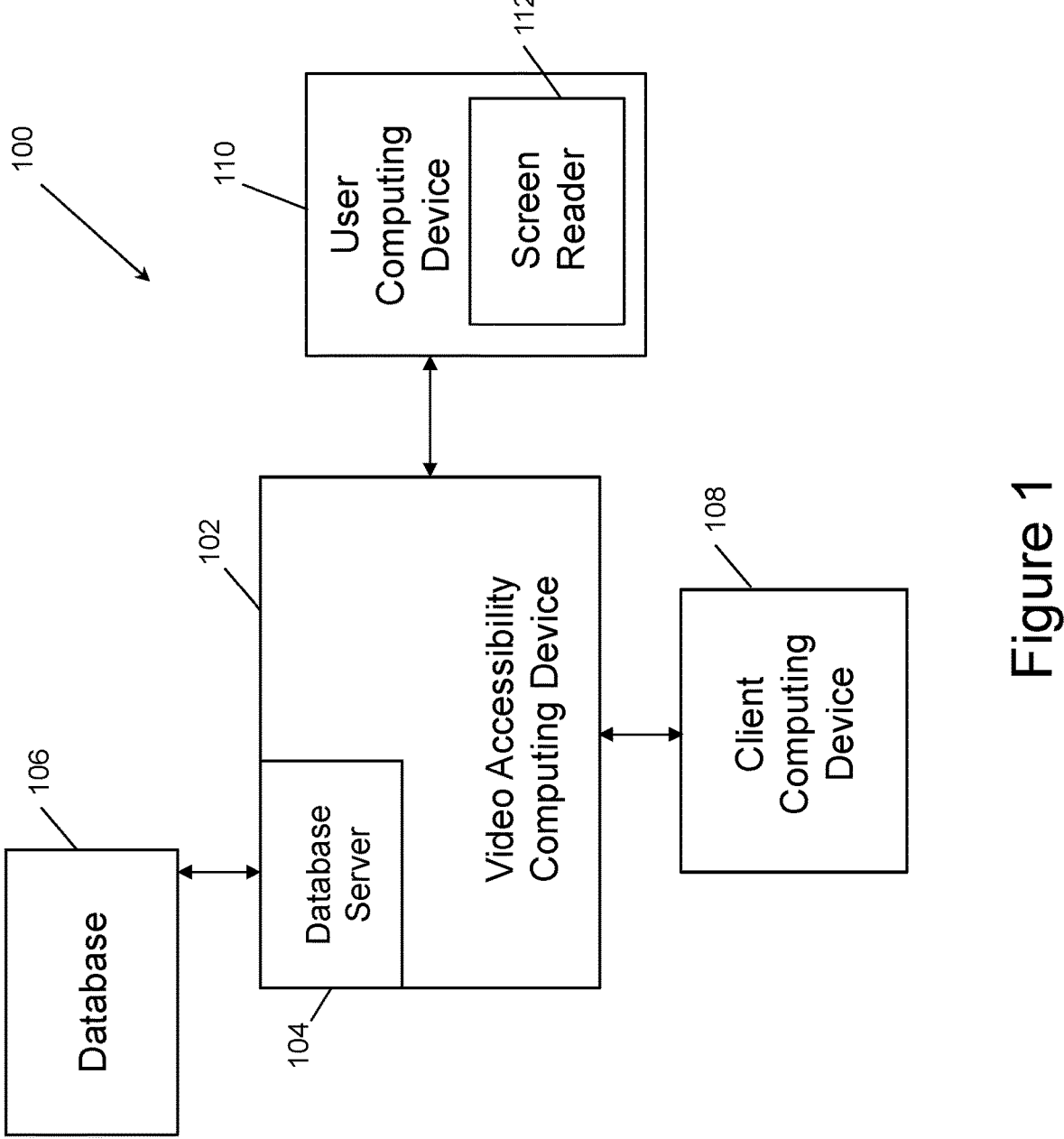
FIG. 1 illustrates an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating interactive videos (e.g., training, advertising, etc.) by embedding code within the video file for accessibility compliance, and more specifically, to systems and methods for analyzing an interactive video file, identifying where in the video file interactive hotspots (also referred to herein as "interactive elements") are located including questions being presented to a viewer, and embedding computer code within the video file associated with the interactive elements to generate an enhanced video file that, when executed, displays a video and interacts with a screen reader device that causes the interactive questions being displayed on the screen to also be converted to audio, braille, or another format so that a visually impaired person is able to interpret the questions and provide answers to them. Thus, the interactive video is more accessible to individuals with physical limitations.

It is desirable for content that is generated for public and/or widespread electronic viewing to be in compliance with accessibility standards such that a wide range of viewers are able to view and/or interact with the content. For example, web content may need to be in compliance with Web Content Accessibility Guidelines (WCAG 2.0) such that the content is accessible for viewers with disabilities including blindness, vision impairment, deafness, hearing impairment, learning disabilities, limited movement, photosensitivity, etc. Having widely accessible content for a wide range of viewers is beneficial to content creators because the content can be accessed and viewed by all users, no matter their disability or physical status. However, creating accessible content can be an expensive and time-consuming process.

The systems and methods described herein enables a company, for example, to create an interactive training video for its employees that complies with accessibility guidelines relating to the visually impaired by analyzing an interactive video file (also referred to herein as an "executable video file"); and identify interactive hotspots located within the video. These interactive hotspots may include questions that are intended to be displayed on a display screen of a user device that is executing the video file. In other words, the video file may include interactive questions that are displayed to a viewed who is then asked to respond to those questions. In some cases, the questions may be multiple-choice questions such that the question is displayed and certain suggested answers are also displayed that the viewer is able to choose from. The viewer then inputs a selected answer into the system and the system indicates whether the selected answer is correct.

The systems and method described herein further include embedding computer code within the video file associated with the interactive elements to generate an enhanced video file that, when executed, displays a video and interacts with a screen reader device that causes the interactive questions being displayed on the screen to also be converted to audio, braille, or any other suitable format so that a visually impaired person is able to interpret the questions and provide answers to them. In other words, after identifying the interactive hotspots within the video file, a user interface is displayed to the developer of the video file that displays the question or prompt being displayed on the screen during the play of the video along with the multiple-choice answers also being displayed. The developer is prompted to input the question or prompt into the system along with the multiple-choice answers, and the system converts the questions/prompts and multiple-choice answers into embeddable code that is saved within the video data file and/or executable video file and associated with that time of the video file to create an enhanced video file. The enhanced video file is then saved for execution by a viewer on a viewer computing device. The embedded code is executable by a screen reader that is in communication with the viewer computing device.

Thus, when a viewer, who may be visually impaired and has a screen reader connected to their viewer computing device, views the video, the viewer will access the enhanced video file using their viewer computing device. The enhanced video file is executed by the viewer computing device so that the video is displayed on the display screen of the computing device and audio is played for the viewer who is visually impaired. This execution further includes executing the embedded code included in the enhanced video file by the screen reader so that the question or prompt is audibly read, translated into braille, or otherwise suitably converted so that the viewer can interpret the question or prompt along with the possible answers that are offered. The viewer can then input the answer that they select into the viewer computing device and the inputted answer may be compared to the actual answer to determine if the inputted answer is correct. The viewer is then told through the audio whether their inputted answer was correct. Alternatively, if the question/prompt is an engagement question/prompt without a correct answer (e.g., a question of "Did that make sense?" or a prompt of "Input which part of the video you would like to review."), the system may customize the video based upon the viewer input to the engagement question/prompt. For example, if the viewer inputs "No" to the "Did that make sense?" question, the system may display the part of the video that did not make sense to the viewer. If the viewer inputs "Yes" to the "Did that make sense?" question, the system may continue showing the video without displaying previously sections of the video.

The systems and methods described herein cure the deficiencies of the known systems for creating interactive videos with embedded code for accessibility compliance, as also referred to herein as "accessible videos," by automatically identifying where interactive elements are in the video files, prompting users to input labels for the interactive elements, and automatically generating an enhanced video file that, when executed, displays an accessible video to a user. The methods described herein may be implemented by a computer system and/or a computing device (e.g., a video accessibility computing device, also known as a VA computing device).

In the exemplary embodiment, a user may transmit executable video files (e.g., in HTML and/or XML formats) and associated video data files (e.g., in MP4, WMV, MOV, FLV, and/or AVI formats) to the VA computing device associated with a video of the user (e.g., a developer of content for an insurance company). For example, the video may be an interactive training or advertising video available over an intranet or through a website accessible through the internet.

The VA computing device analyzes the input video file(s) and identifies interactive elements and associated time-stamps included in the video input file(s). That is, the VA computing device determines where in the video the interactive elements are located. The VA computing device transmits a prompt and/or a request to the user to input accessibility information for each identified interactive element. For example, the VA computing device may prompt the user to input labels (e.g., Accessible Rich Internet Applications labels or "ARIA" labels) for the answers associated with a true/false statement. The VA computing device then receives the user input from a computing device of the user once the user input has been submitted.

The VA computing device converts the user input responses into executable language (e.g., such that the responses can be read by a screen reader) snippets and embeds the executable language into the video input file(s) to create an enhanced video file. The VA computing device may input the executable language associated with each interactive element into the video input file(s) at the time-stamp of each interactive element (e.g., such that the language is read when the interactive element is displayed on the screen). The VA computing device stores the enhanced video file in a memory device of the VA computing device and transmits the enhanced video file to a viewer computing device to be executed by the viewer computing device. That is, the enhanced video file includes instructions embedded by the VA computing device that, when executed by the viewer computing device and/or an accessibility device (e.g., a screen reader), cause the viewer computing device to display the enhanced video file and the associated accessibility features such that a viewer of the viewer computing device can interact with the enhanced video file.

For example, the VA computing device may identify that a video input file (e.g., input into the VA computing device by a user) has a run time of two minutes and one interactive element at 36 seconds into the video. The VA computing device may determine that the interactive element is a multiple-choice question that asks, "How big is the population of New York City?" and is accompanied by four answers. The VA computing device may prompt the user to input the four answers into the VA computing device. The user may determine (e.g., upon viewing the video) that the answers are "A. 5 million," "B. 10 million," "C. 20 million,"

and "D. 8 million" and accordingly input the answers into the prompt of the VA computing device, indicating that D is the correct answer. The VA computing device may then convert the input response options into executable language that, when executed by a viewer computing device and/or an accessibility device (e.g., a screen reader) causes the interactive element to be read aloud to the viewer, transmitted to the viewer in braille, and/or converted into any suitable format such that the viewer can interpret the questions/prompt and associated answers. The VA computing device may embed the executable language snippet into the video input file at the timestamp (e.g., 36 s) of the interactive element to create an enhanced video file such that the interactive element is accessible to the viewers at the time it is shown in the video. The VA computing device may then store the enhanced video file in a database and transmit the enhanced video file to a viewer computing device to be executed. The enhanced video file, when executed by the viewer computing device, causes the accessible and interactive video to be displayed and/or explained to a viewer such that the viewer can interact with and understand the video.

The VA computing device may further streamline the process of generating accessible and interactive videos through the utilization of machine learning and/or artificial intelligence techniques. That is, the VA computing device may store historical user input (e.g., the user-input labels or responses) and build a model that predicts input response options based upon the historical user inputs. Accordingly, when prompting the user for response inputs, the VA computing device may provide suggested response inputs for the user in the prompt. The users may be able to quickly approve the suggested response inputs and/or edit the response inputs if the users disagree with the suggested response inputs. For example, if the VA computing device learns, using the generated model, that a user almost always labels the answer choices of an interactive element including a statement and accompanied by two answer choices as "True" and "False," the next time the VA computing device identifies an interactive element meeting this criteria, the VA computing device may provide the user with suggested input responses of "True" and "False."

Exemplary technical effects of the systems and methods described herein may include, for example: (a) automatically converting user inputs into executable language to be embedded in a video file (e.g., such that a user does not have to manually input the code into the video file), (b) providing interactive videos to customers and employees with ease, (c) drastically reducing the amount of time it takes to create an accessible, interactive video, (d) reducing budgets for creating accessible, interactive videos due to the elimination of a specific developer to manually input the accessibility code, (e) automatically generating executable language to be embedded into video files that is unique to each input video file, (f) using machine learning and/or artificial intelligence techniques to generate suggested user input, and (g) eliminating the need for a user proficient in both video coding/programming and accessibility compliance standards by providing a user interface where the user can input plain language text to be converted by the system into computer-executable code.

The technical effects may be realized when at least one of the following steps is implemented: (i) receiving a video executable file and associated video data file, (ii) identifying one or more interactive elements in the video executable file by scanning the video executable file, (iii) prompting a user to input at least one response option for each identified interactive element, (iv) converting the at least one response option into an executable code snippet, (v) creating an enhanced video executable file by embedding the executable code snippet of each respective interactive element into the video executable file for execution at a designated time, and (vi) transmitting the enhanced video executable file to a viewer device to be executed.

Exemplary Computer System

FIG. 1 depicts a simplified block diagram of an exemplary computer system 100. In the exemplary embodiment, system 100 may be used for generating an accessible video to be displayed to viewers. In the exemplary embodiment, system 100 may include a video accessibility (VA) computing device 102 and a database server 104. VA computing device 102 may be in communication with one or more databases 106 (or other memory devices), client computing devices 108, and/or user computing devices 110 (also referred to herein as "viewer computing devices 110").

In the exemplary embodiment, client computing devices 108 may be computers that include a web browser or a software application, which enables client devices 108 to access remote computer devices, such as VA computing device 102, using the Internet or other network. More specifically, client computing devices 108 may be communicatively coupled to VA computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Client computing devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, client computing devices 108 may be associated with, or part of, a computer network associated with an insurance provider or in communication with the insurance provider's computer network (now shown). For example, client computing device 108 may be a computer of a developer of the insurance provider. In other embodiments, client computing devices 108 are associated with any company that provides interactive videos to employees and/or users.

A user computing device 110 may be communicatively coupled with VA computing device 102. In some embodiments, user computing device 110 may be associated with a viewer that views the videos associated with client computing device 108. For example, user computing device 110 may be associated with an employee or a customer of the insurance provider associated with client computing device 108. User computing device 110 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computing device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

User computing device 110 includes a screen reader 112. Screen reader 112 may be any accessibility device that assists users in viewing and/or interacting with videos and other media displayed to the users through user computing device 110. For example, screen reader 112 may translate text, images, and other media displayed on user computing device 110 to a speech or braille output. That is, if an image of a flower is displayed on user computing device 110 with a description of "rose" underneath the image, screen reader 112 may output audio to the user that say, "a red flower is shown on the screen with the description rose." In the exemplary embodiment, VA computing device 102 outputs instructions to screen reader 112, that when executed by user computing device 110 and/or screen reader 112, cause screen reader 112 to describe interactive elements of videos generated by VA computing device 102 to user, as described further herein.

Database server 104 may be communicatively coupled to database 106 that stores data. In one embodiment, database 106 may include video input data, interactive element data, timestamp data, user inputs, enhanced video files, etc. In the exemplary embodiment, database 106 may be stored remotely from VA computing device 102. In some embodiments, database 106 may be decentralized. In the exemplary embodiment, a user may access database 106 and/or VA computing device via client computing device 108.

VA computing device 102 may be in communication with a plurality of client computing devices 108 and user computing devices 110 to generate and interactively display videos to user of user computing device 110. In some embodiments, VA computing device 102 may be associated with an insurance provider or be in communication with the insurance provider's computer network (not shown). In other embodiments, VA computing device 102 may be associated with a third party (e.g., that generates interactive videos on behalf of the insurance provider).

Exemplary Process for Determining Acquisition Cost

Figure 2:
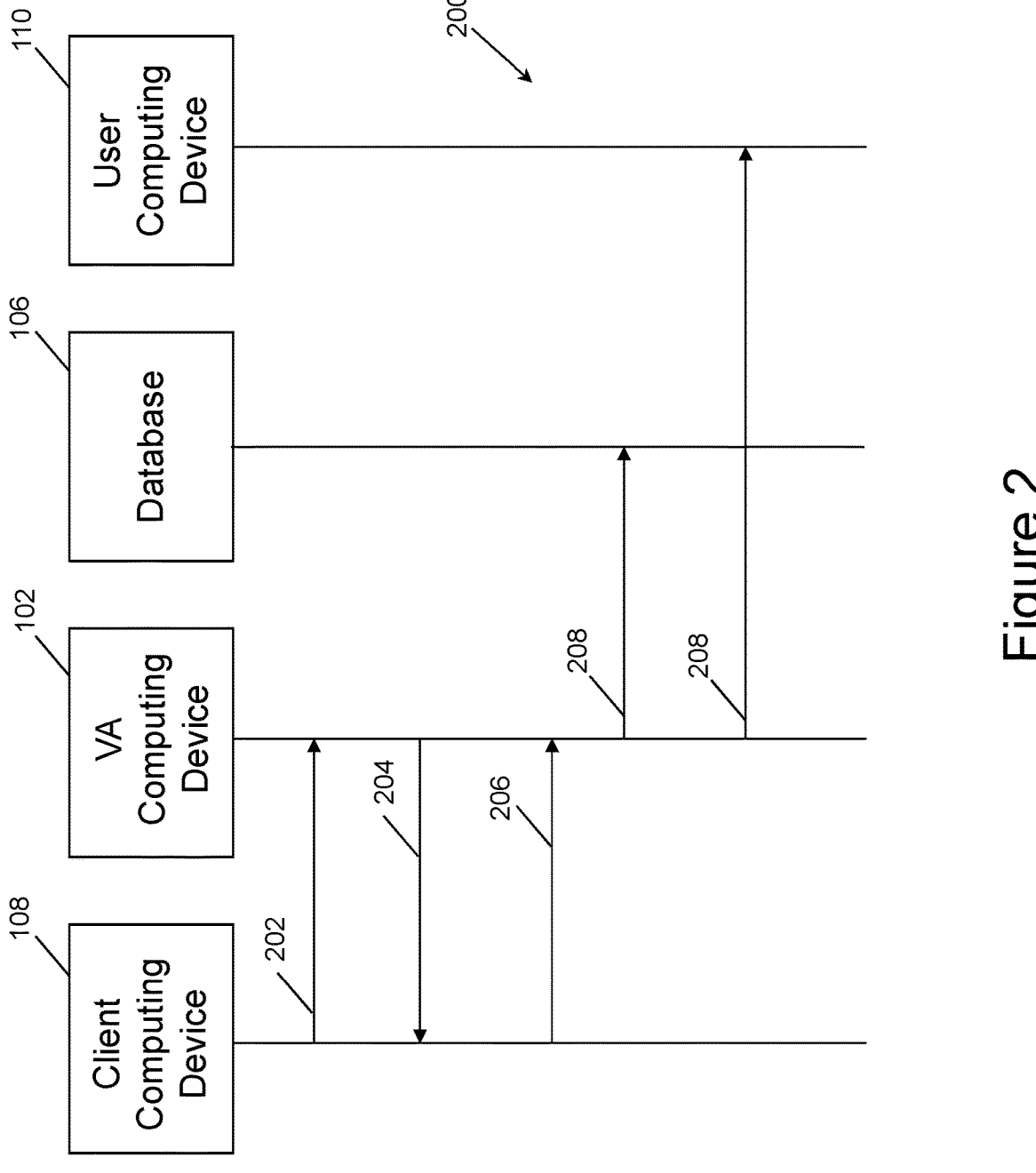
FIG. 2 illustrates a flow chart of an exemplary process that may be carried out by the computer system illustrated in FIG. 1.

FIG. 2 illustrates a flow chart of an exemplary process 200 for generating accessible videos for one or more viewers (e.g., associated with user computing devices 110). Process 200 may be carried out by computer system 100 (shown in FIG. 1).

In the exemplary embodiment, client computing device 108 transmits executable video files 202 to VA computing device 102. Video input files 202 may be HTML files, XML files, and/or URLs and the associated video data files (e.g., MP4 files, WMV files, MOV files, FLV files, and/or an AVI files) associated with a video of client computing device 108. For example, the video of client computing device 108 may be an interactive training or advertising video available over an intranet or through a website accessible through the internet.

VA computing device 102 analyzes executable video file(s) 202 and identifies interactive elements and associated timestamps included in executable video file(s) 202. VA computing device 102 transmits a request 204 to a user of client computing device 108 for the user to input accessibility information for each identified interactive element. Request 204 may include each identified interactive element and an associated prompt for the user to input the accessibility information (e.g., response options). For example, VA computing device 102 may identify a multiple-choice interactive element in executable video file(s) 202 and prompt the user to input each multiple-choice answer through request 204. Client computing device 108 transmits response options 206 to VA computing device 102 once the user has input the accessibility information into request 204.

Once VA computing device 102 receives response options 206, VA computing device 102 converts the user input into executable code snippets (e.g., such that the user input can be read by a screen reader). VA computing device 102 then embeds the executable code into the executable video file(s) 202 to create an enhanced video file 208. That is, for example, VA computing device 102 embeds the executable code into the XML file of the input executable video file 202. For example, VA computing device 102 may input the executable code snippet associated with each interactive element into the executable video file(s) at the timestamp of the interactive element (e.g., such that the language is read when the interactive element is displayed on the screen).

VA computing device 102 stores enhanced video file 208 in database 106. Further, VA computing device 102 transmits enhanced video file 208 to user computing device 110 to be executed by user computing device 110. That is, enhanced video file 208 includes instructions that, when executed by user computing device 110 and/or screen reader 112 (shown in FIG. 1), cause user computing device 110 to display enhanced video file 208 and the associated accessibility features such that a viewer of user computing device 110 can interact with enhanced video file 208.

Exemplary Computing Device

Figure 3:
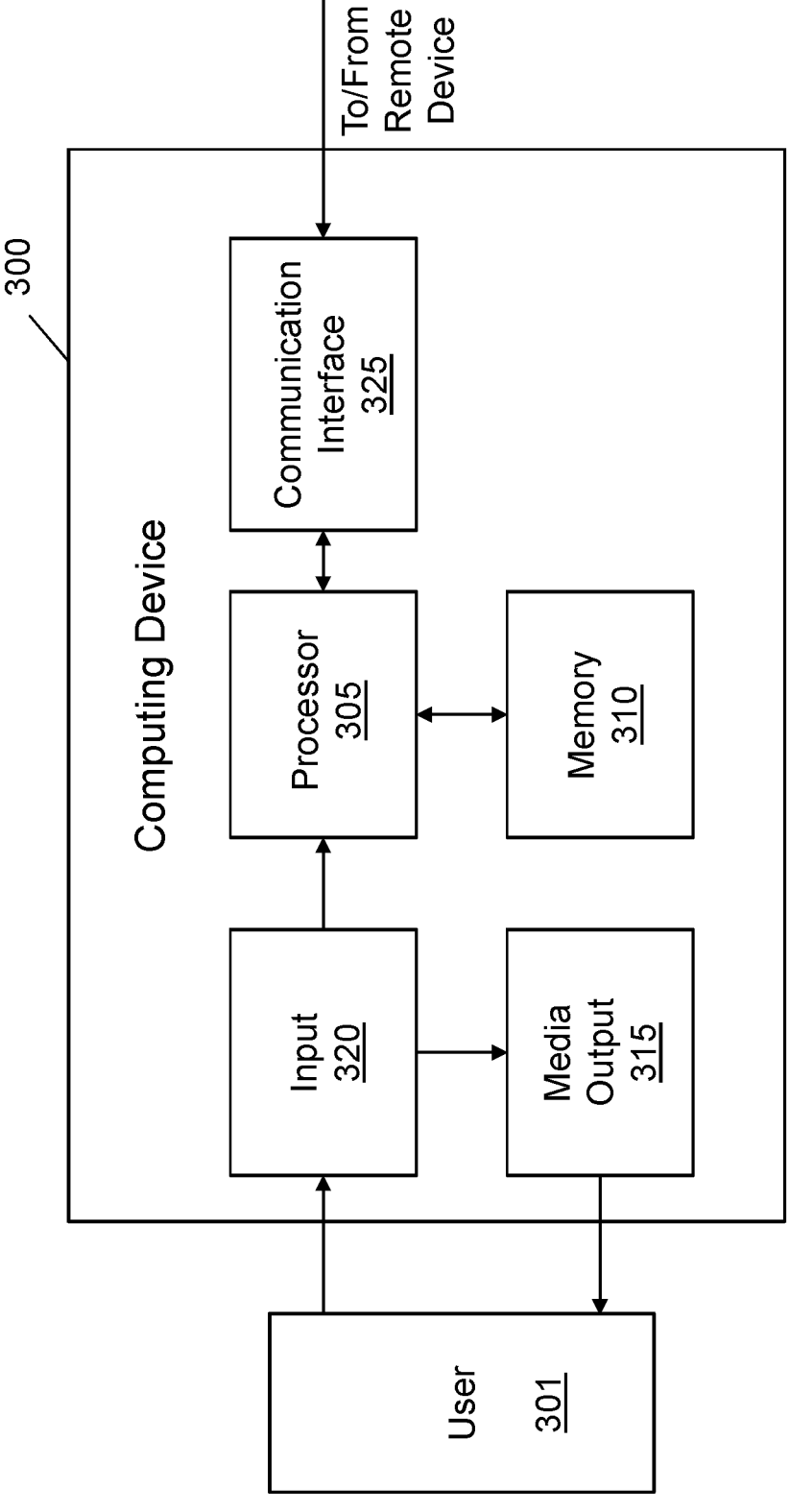
FIG. 3 illustrates an exemplary client computing device that may be used with the exemplary computer system illustrated in FIG. 1.

FIG. 3 depicts an exemplary configuration of a computing device 300, such as client computing device 108 and/or user computing device 110, as shown in FIG. 1, and in accordance with one embodiment of the present disclosure. Computing device 300 may be operated by a user 301. Computing device 300 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions (e.g., of an enhanced video file, as described herein) to be stored and retrieved. Memory area 310 may include one or more computer readable media.

Computing device 300 may also include at least one media output component 315 for presenting information to user 301. Media output component 315 may be any component capable of conveying information to user 301. For example, media output component 315 may be a screen reader (e.g., screen reader 112) and/or screen reader 112 may be in communication with media output component 315. In some embodiments, media output component 315 may include an output adapter (not shown) such as a video adapter and/or an audio adapter. An output adapter may be operatively coupled to processor 305 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. A graphical user interface may include, for example, a website displaying an interactive advertising video or an intranet link displaying an interactive training video. In some embodiments, computing device 300 may include an input device 320 for receiving input from user 301. User 301 may use input device 320 to, without limitation, select and/or enter data, such as, for example, accessibility data (e.g., from a user of client computing device 108) and/or answer data (e.g., from a user of user computing device 110).

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

Computing device 300 may also include a communication interface 325, communicatively coupled via a network to VA computing device 102 (shown in FIG. 1). Communication interface 325 may include, for example, a wired or wireless network adapter and/or a wireless data transceiver for use with a mobile telecommunications network.

Figure 4:
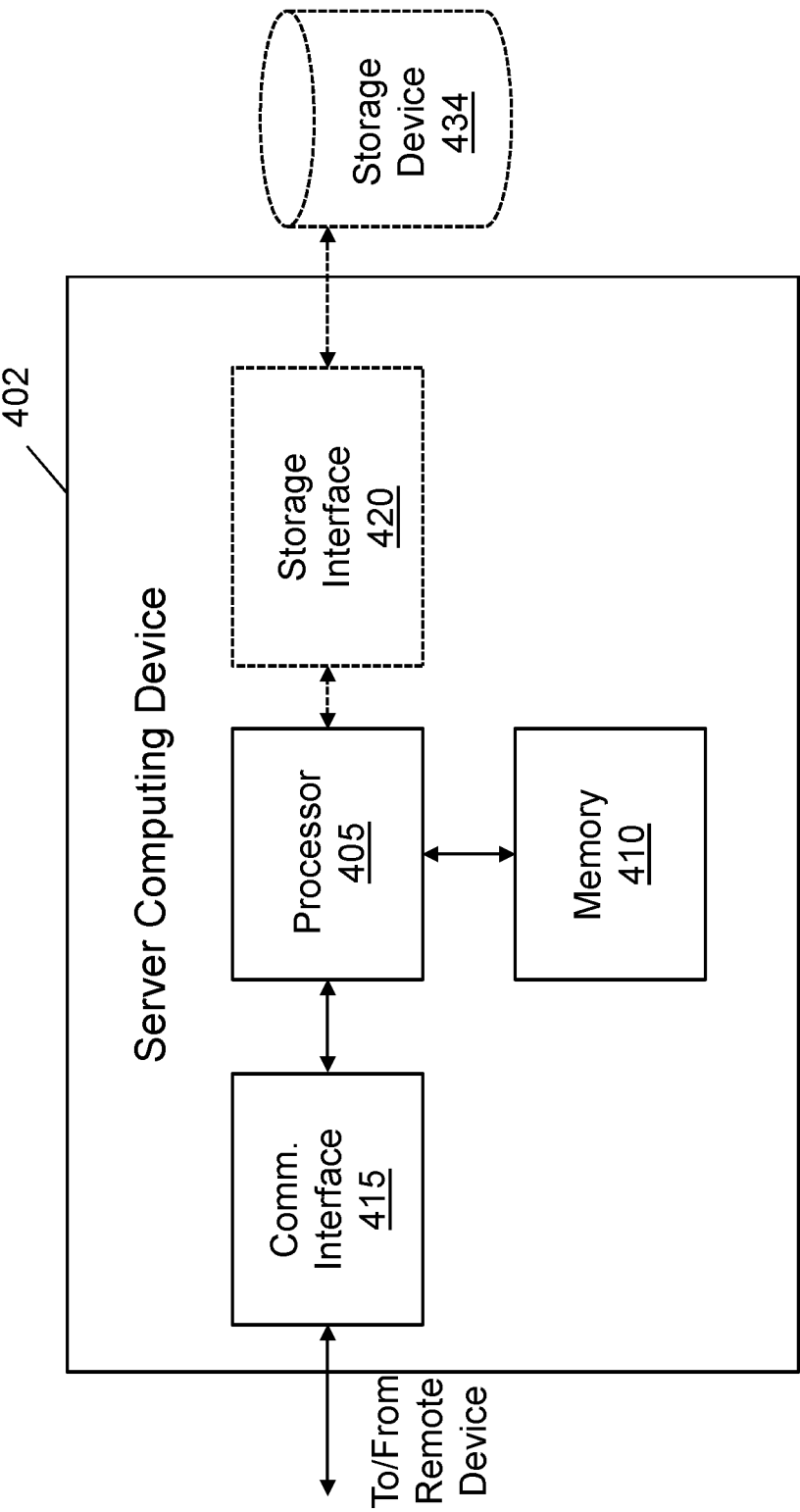
FIG. 4 illustrates an exemplary configuration of a server that may be used in the exemplary computer system illustrated in FIG. 1.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website Exemplary Server System FIG. 4 depicts an exemplary server system 400 such as VA computing device 102, as shown in FIG. 1, and in accordance with one exemplary embodiment of the present disclosure. Accordingly, server system 400 may include a processor 405 for executing instructions. Instructions may be stored in a memory area 410. Processor 405 may include one or more processing units (e.g., in a multi-core configuration).

Processor 405 may be operatively coupled to a communication interface 415 such that server system 400 is capable of communicating with a remote computing device. For example, communication interface 415 may receive requests from client computing devices 108 and/or user computing devices 110 via the Internet and/or over a computer network.

Processor 405 may also be operatively coupled to a storage device 425 (e.g., database 110, shown in FIG. 1). Storage device 425 may be any computer-operated hardware suitable for storing and/or retrieving data. In some embodiments, storage device 425 may be integrated in server system 400. For example, server system 400 may include one or more hard disk drives as storage device 425. In other embodiments, storage device 425 may be external to server system 400 and may be accessed by a plurality of server systems 400. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Exemplary User Displays

Figure 5A:
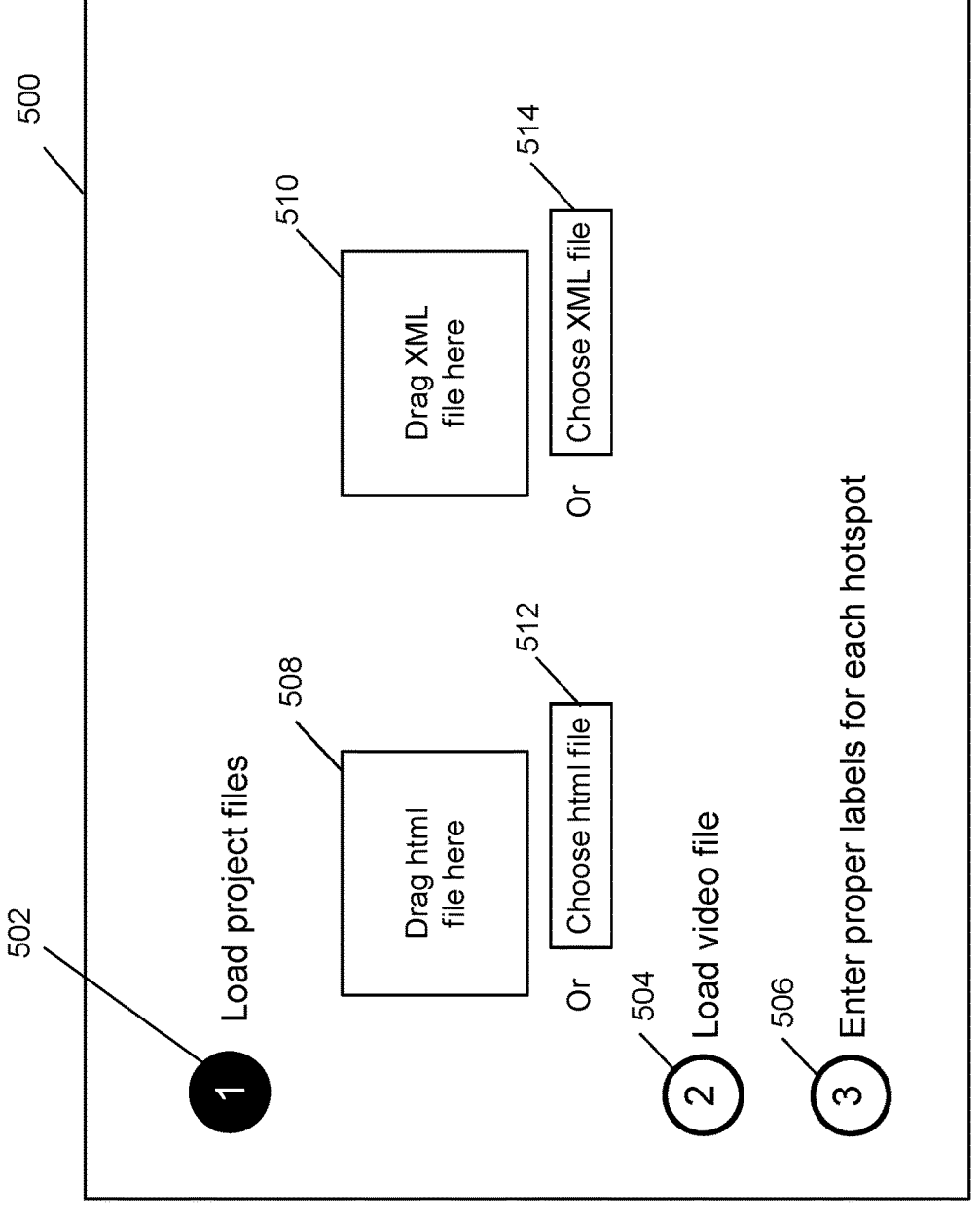
FIGS. 5A, 5B, and 5C illustrate exemplary screenshots that may be displayed to a client in the exemplary computer system shown in FIG. 1.
Figure 5B:
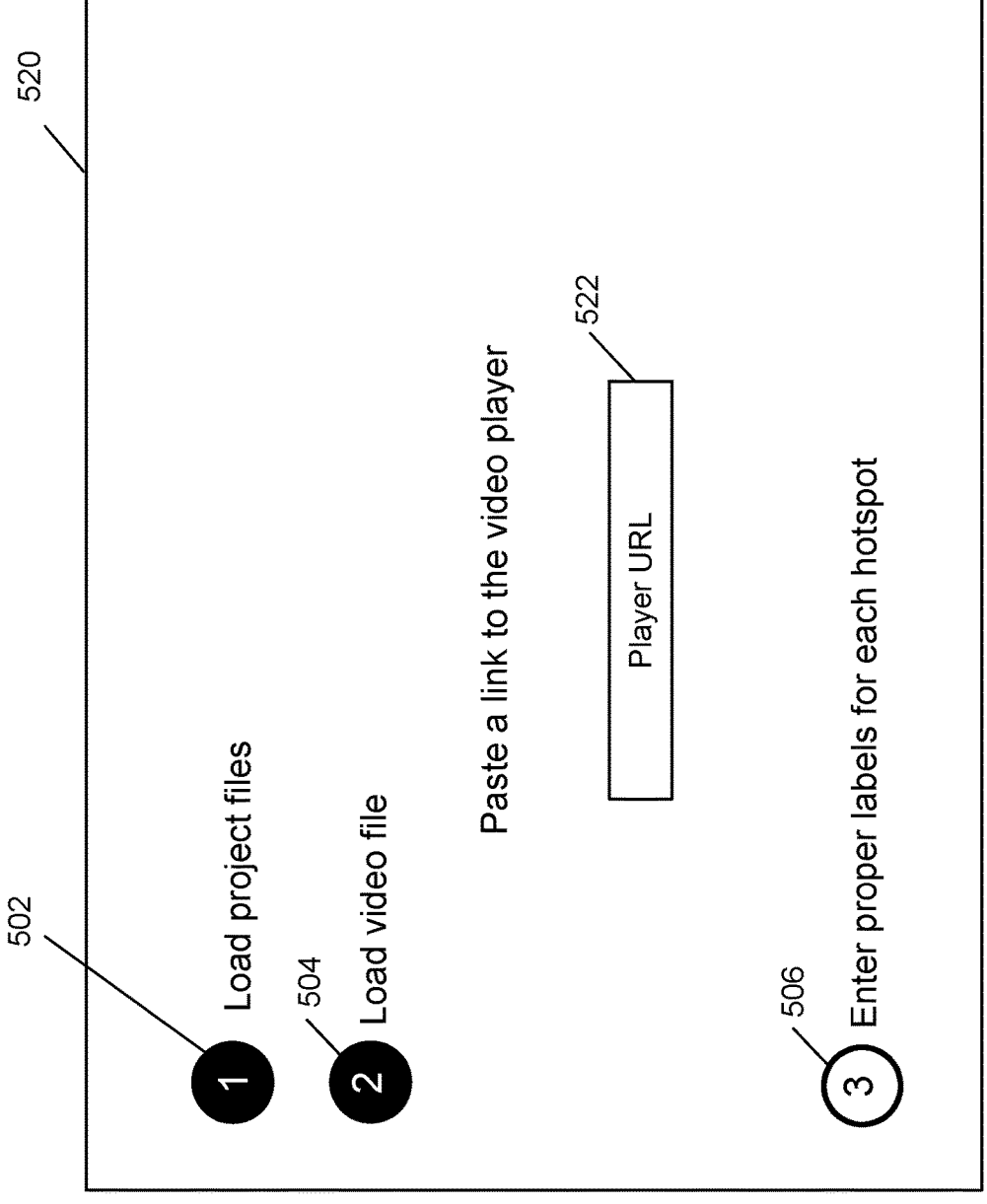
Figure 5C:
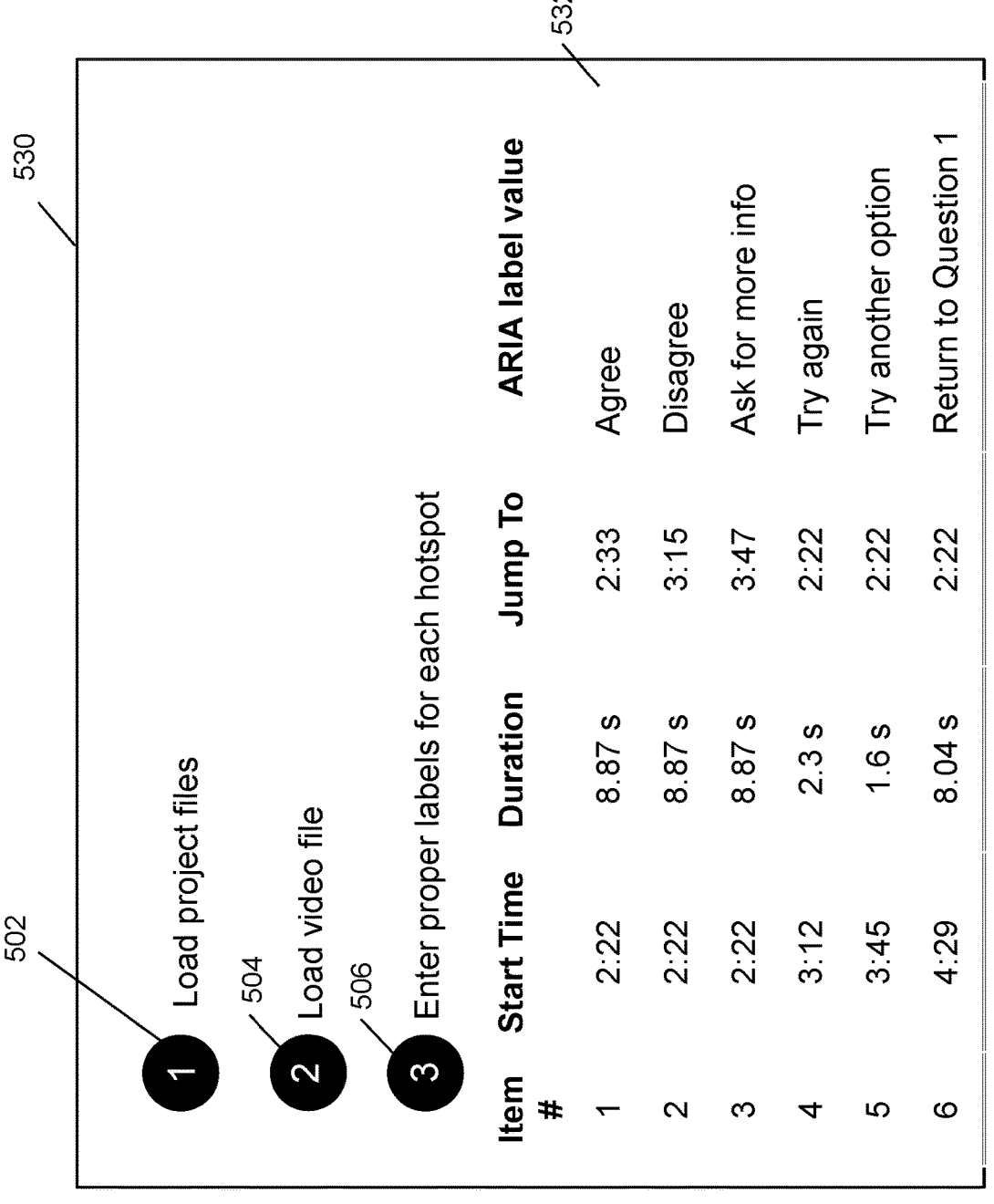

FIGS. 5A, 5B, and 5C illustrate example displays 500, 520, 530 that may be displayed by a computing device (e.g., VA computing device 102, shown in FIG. 1) to a user (e.g., of client computing device 108) when prompting the user to input video and accessibility data.

FIG. 5A shows display 500 of a first step 502 of generating (e.g., by VA computing device 102) an accessible video. First step 502 is loading a project file. For example, the project file may be an interactive training or advertisement video. Display 500 also includes second step 504 and third step 506 that are carried out in displays 520 and 530, respectively.

First step 502 includes a first drop box 508 that is configured to accept an html file of the accessible video and a second drop box 510 that is configured to accept an XML file of the accessible video (e.g., the video executable files). That is, the user may open a file where the video is stored (e.g., on client computing device 108, shown in FIG. 1) and drag the video file into the respective drop box 508 or 510. First step 502 also includes a first button 512 and a second button 514. First button 512, when pressed, may, for example, bring up a documents folder (not shown) of client computing device 108 such that the user can select the html file of the accessible video from the documents folder. Second button 514, when pressed, may, for example, bring up a documents folder (not shown) of client computing device 108 such that the user can select the XML file of the accessible video from the documents folder. Once the html file and the XML file of the accessible video are uploaded to VA computing device 102, VA computing device 102 may show second display 520 on client computing device 108.

Second display 520 includes second step 504, and second step 504 is loading the video file (e.g. the video data file associated with the video executable file). Second step 504 includes a text box 522 such that the user can paste the video player URL. For example, the video player URL may allow the accessible video to be displayed when the URL is accessed through an intranet or an internet (e.g., by user computing device 110). Once the video player URL is inserted into text box 522 and uploaded to VA computing device 102, VA computing device 102 may analyze video input files (e.g., the html file, the XML file, and the video player URL) to identify where interactive elements are located in the video files. VA computing device 102 may show third display 530 on client computing device 108 once the interactive elements are identified.

Third display 530 includes third step 506, and third step 506 is entering proper labels for each interactive element. In the exemplary embodiment, VA computing device 102 identified six interactive elements. VA computing device 102 displays the item numbers, start time of each interactive element (e.g., a timestamp of each interactive element), a duration of each interactive element, where the video should jump to based upon the interactive element selected, and an ARIA label value for each interactive element. The label value for each interactive element may be the item that the user is prompted to fill in. For example, each label value may initially be left blank, and a text box 532 may be included with each interactive element. The user may fill in text box 532 with each respective label of each interactive element. For example, the labels of each interactive element that may be input by the user may be "Agree," "Disagree," "Ask for more info," "Try again," "Try another option," and/or "Return to Question 1." In some embodiments, VA computing device 102 may automatically populate the labels (e.g., using a model to predict the labels based on previous user input), and users may change the labels if the labels are incorrect and/or indicate that each label is approved.

Once the labels have been input and/or approved by the user, VA computing device 102 may generate (e.g., in response to a user clicking a "Generate" button, not shown) an enhanced video file including the response options associated with the interactive elements. The enhanced video file may be downloaded to client computing device 108 of the user as a replacement HTML file for the HTML file originally uploaded (e.g., as shown in FIG. 5A). Once the enhanced video file is downloaded to client computing device 108 of the user, the user may distribute and/or upload the enhanced video file (e.g., to VA computing device 102). The generated enhanced video file is configured to be displayed to a viewer (e.g., of user computing device 110) such that the viewer can interact with the interactive elements of the video, even if the viewer is disabled or impaired. That is, the viewer may view the enhanced video file as an HTML page with an embedded video.

The interactive video displayed to the viewer may be customizable and unique to the viewer based upon which of the response options the viewer selects, as shown in the "Jump To" column of display 530. Notably, display 530 is displayed to users of client computing device 108 before the enhanced video file is executed, and display 530 is not displayed to viewers of the enhanced video file. Rather, display 530 illustrates how the enhanced video file is customizable to viewers based upon the input responses of viewers. For example, if the viewer chooses, while the enhanced executable video file is being displayed to the viewer, "Agree" to the interactive element with a start time of 2:22, the enhanced executable video file may jump to timestamp 2:33 of the video based upon the input of the viewer. Alternatively, if the viewer chooses, while the enhanced executable video file is being displayed to the viewer, "Disagree" to the interactive element with the start time of 2:22, the enhanced executable video file may jump to timestamp 3:15 of the video based upon the input of the viewer. Additionally, if the viewer chooses, while the enhanced executable video file is being displayed to the viewer, "Return to Question 1" to the interactive element with a start time of 4:29, the enhanced executable video file may jump back to timestamp 2:22 of the video based upon the input of the viewer. Accordingly, the interactive video is customized and accessible to the viewer based upon the viewer input.

Exemplary Computer-Implemented Method

FIG. 6 illustrates a flow chart of an exemplary computer-implemented process 600 for generating an accessible video. Process 600 may be implemented, at least in part, by a computer system, for example, computer system 100 (shown in FIG. 1) and/or by a computing device/server, for example, VA computing device 102 (shown in FIG. 1).

Process 600 may include receiving 610, by VA computing device 102, a video executable file and an associated video data file. For example, the video executable file may be associated with an interactive training and/or advertisement video of a company. The video executable file may be in, for example, an XML and/or html format. The associated video data file may be in an MP4, WMV, MOV, FLV, and/or AVI format. Process 600 may further include identifying 620, by VA computing device 102, one or more interactive elements in the video executable file by scanning the video executable file. For example, VA computing device 102 may scan the video executable file for any interactive flags or known code related to interactive elements and flag and/or store each section of the video executable file identified as being associated with an interactive element.

Process 600 further includes prompting 630, by VA computing device 102, a user to input at least one response option for each identified interactive element. For example, it may be identified 620 that the interactive element is a true/false statement, and the user may input a "True" response option and a "False" response option. The response option may be in the form of plain language inputted by the user. Process 600 further includes converting 640, by VA computing device 102, the at least one response option into an executable code snippet. For example, the executable code snippet, when executed, may cause the response option input by the user to be read aloud, translated into braille, or converted into any other format such that a viewer with disabilities may interpret the prompt and response options.

Process 600 further includes creating 650, by VA computing device 102, an enhanced video executable file. Specifically, VA computing device 102 may embed the executable code snippet of each respective interactive element into the video executable file for execution at a designated time. The enhanced video executable file may be transmitted 660, by VA computing device 102, to a viewer device to be executed.

Exemplary Embodiments & Functionality

In one aspect, a computing system including a processor in communication with at least one memory may be provided. The processor may be configured to: (i) receive a video executable file, (ii) identify one or more interactive elements in the video executable file by scanning the video executable file, (iii) prompt a user to input at least one response option for each identified interactive element, (iv) convert the at least one response option into an executable code snippet, (v) create an enhanced video executable file by embedding the executable code snippet of each respective interactive element into the video executable file for execution at a designated time, and (vi) store the enhanced video executable file to be accessible by a viewer device, wherein the video executable file is executed by the viewer device. The computer system may include additional, less, or alternate functionality, including that discussed elsewhere herein.

For example, the enhanced video executable file may include instructions that, when executed by the viewer device including an accessibility extension that includes a screen reader, cause the screen reader of the viewer device to at least one of read aloud and translate to braille the at least one response option to a viewer of the viewer device. The video executable file may also include interactive element data and a timestamp associated with the interactive element data.

Further, the processor may further be programmed to: (i) match the at least one response option with the timestamp of each interactive element to create the enhanced video executable file, wherein the enhanced video executable file further includes instructions that, when executed by the viewer device, cause the viewer device to read aloud the at least one response option at each timestamp, (ii) receive, from the viewer device, viewer responses for each interactive element, (iii) jump to a section of the enhanced video executable file linked to the viewer responses for each interactive element, (iv) generate, using at least one of machine learning and artificial intelligence techniques, a model to predict suggested response options for interactive elements based upon prior input response options associated with each interactive element, (v) utilize the model to provide, in prompting the user, suggested response options for each identified interactive element, and/or (vi) receive a selection of one or more suggested response options as the one or more input response options.

Additionally, the interactive elements may include at least one of a multiple-choice response prompt, a short answer response prompt, and a true or false response prompt. The video executable file may include at least one of an html file and an XML file. A video data file may be associated with the video executable file, and the video data file may include at least one of an MP4 file, a WMV file a MOV file, an FLV file, and an AVI file.

In another embodiment, a computer-implemented method implemented by a computing system including a processor in communication with at least one memory may be provided. The method may include: (i) receiving a video executable file, (ii) identifying one or more interactive elements in the video executable file by scanning the video executable file, (iii) prompting a user to input at least one response option for each identified interactive element, (iv) converting the at least one response option into an executable code snippet, (v) creating an enhanced video executable file by embedding the executable code snippet of each respective interactive element into the video executable file for execution at a designated time, and (vi) storing the enhanced video executable file to be accessible by a viewer device, wherein the video executable file is executed by the viewer device. The method may include additional, less, or alternate actions, including those discussed elsewhere herein.

In yet another embodiment, at least one non-transitory computer-readable storage media having computer-executable instructions embodied thereon may be provided. When executed by at least one processor in communication with at least one memory device, the computer-executable instructions may cause the processor to: (i) receive a video executable file and associated video data file, (ii) identify one or more interactive elements in the video executable file by scanning the video executable file, (iii) prompt a user to input at least one response option for each identified interactive element, (iv) convert the at least one response option into an executable code snippet, (v) create an enhanced video executable file by embedding the executable code snippet of each respective interactive element into the video executable file for execution at a designated time, and (vi) store the enhanced video executable file to be accessible by a viewer device, wherein the video executable file is executed by the viewer device. The instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models (e.g., maintenance, charging, and/or pricing models, which may be part of a single model or be separate models) may be created based upon example inputs in order to make valid and reliable predictions for novel inputs.

Additionally or alternatively, the machine learning programs may be trained by inputting sample data sets or certain data into the programs, such as vehicle telematics data, and/or industry vehicle maintenance data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. In one embodiment, the system includes a plurality of virtual computing devices (e.g., virtual machines) in a cloud configuration, such that the virtual computing devices may be dynamically allocated. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A video accessibility computing system comprising a processor in communication with at least one memory, the processor configured to:

generate and display a user interface including one or more data entry fields for input, by a select user, of parts of an interactive video;

receive, via the one or more data entry fields, a video executable file as one part of the interactive video;

scan the video executable file;

identify one or more interactive elements in the video executable file, wherein the one or more interactive elements includes one or more locations within the interactive video at which at least one question is configured to be presented to a viewer of the interactive video;

receive, via the one or more data entry fields, at least one response input by the select user to the at least one question;

convert the at least one response into at least one executable code snippet;

create an enhanced video executable file by embedding the at least one executable code snippet into the video executable file for execution at a designated time; and store the enhanced video executable file in the at least one memory to be accessible by a viewer device, wherein the enhanced video executable file is configured to be executed by the viewer device in association with playback of the interactive video and, when executed by the viewer device, causes at least the at least one response to be presented by the viewer device to the viewer of the interactive video in an output format specific to the viewer.

2. The computing system of claim 1, wherein the enhanced video executable file includes instructions that, when executed by the viewer device including an accessibility extension that includes a screen reader, cause the screen reader of the viewer device to at least one of (i) read aloud, in association with an audible output associated with the output format or (ii) translate to braille, in association with a tactile output associated with the output format, the at least one response to the viewer of the interactive video, wherein the reading aloud or the translating to braille the at least one response is associated with a disability of the viewer.

3. The computing system of claim 2, wherein the video executable file includes interactive element data and a timestamp associated with the interactive element data, wherein the interactive element data is associated with the one or more interactive elements.

4. The computing system of claim 3, wherein the processor is further configured to:

match the at least one response with the timestamp of each interactive element of the one or more interactive elements to create the enhanced video executable file, wherein the enhanced video executable file further includes instructions that, when executed by the viewer device, cause the viewer device to at least one of (i) read aloud, in association with the audible output or (ii) translate to braille, in association with the tactile output, the at least one response at each timestamp.

5. The computing system of claim 4, wherein the processor is further configured to:

receive, from the viewer device, viewer responses for each interactive element; and move to a section of the enhanced video executable file linked to the viewer responses for each interactive element such that the enhanced video executable file is customized for the viewer based upon the viewer responses.

6. The computing system of claim 1, wherein the processor is further configured to:

generate, using at least one of machine learning and artificial intelligence techniques, a model to predict suggested responses for interactive elements based upon prior input responses associated with each interactive element.

7. The computing system of claim 6, wherein the processor is further configured to:

utilize the model to provide, in association with prompting the select user to input a response, the predicted suggested responses for each of the identified one or more interactive elements; and receive a selection of one or more of the predicted suggested responses as the at least one response.

8. The computing system of claim 1, wherein one or more types of response prompts associated with the at least one response include at least one of a multiple-choice response prompt, a short answer response prompt, and a true or false response prompt, wherein the video executable file includes at least one of an html file and an XML file, wherein a video data file is associated with the video executable file, and wherein the video data file includes at least one of an MP4 file, a WMV file a MOV file, an FLV file, and an AVI file.

9. A computer-implemented method implemented by a video accessibility computing system including a processor in communication with at least one memory, the method comprising:

generating and displaying a user interface including one or more data entry fields for input, by a select user, of parts of an interactive video;

receiving, via the one or more data entry fields, a video executable file as one part of the interactive video;

scanning the video executable file;

identifying one or more interactive elements in the video executable file, wherein the one or more interactive elements includes one or more locations within the interactive video at which at least one question is configured to be presented to a viewer of the interactive video;

receiving, via the one or more data entry fields, at least one response input by the select user to the at least one question;

converting the at least one response into at least one executable code snippet;

creating an enhanced video executable file by embedding the at least one executable code snippet into the video executable file for execution at a designated time; and storing the enhanced video executable file in the at least one memory to be accessible by a viewer device, wherein the enhanced video executable file is configured to be executed by the viewer device in association with playback of the interactive video and, when executed by the viewer device, causes at least the at least one response to be presented by the viewer device to the viewer of the interactive video in an output format specific to the viewer.

10. The computer-implemented method of claim 9, wherein the enhanced video executable file includes instructions that, when executed by the viewer device including an accessibility extension that includes a screen reader, cause the screen reader of the viewer device to at least one of (i) read aloud, in association with an audible output associated with the output format or (ii) translate to braille, in association with a tactile output associated with the output format, the at least one response to the viewer of the viewer device, wherein the reading aloud or the translating to braille the at least one response is associated with a disability of the viewer.

11. The computer-implemented method of claim 10, wherein the video executable file includes interactive element data and a timestamp associated with the interactive element data, wherein the interactive element data is associated with the one or more interactive elements.

12. The computer-implemented method of claim 11 further comprising:

matching the at least one response with the timestamp of each interactive element of the one or more interactive elements to create the enhanced video executable file, wherein the enhanced video executable file further includes instructions that, when executed by the viewer device, cause the viewer device to at least one of (i) read aloud, in association with the audible output or (ii) translate to braille, in association with the tactile output, the at least one response at each timestamp.

13. The computer-implemented method of claim 12 further comprising:

receiving, from the viewer device, viewer responses for each interactive element; and moving to a section of the enhanced video executable file linked to the viewer responses for each interactive element such that the enhanced video executable file is customized for the viewer based upon the viewer responses.

14. The computer-implemented method of claim 9 further comprising:

generating, using at least one of machine learning and artificial intelligence techniques, a model to predict suggested responses for interactive elements based upon prior input responses associated with each interactive element.

15. The computer-implemented method of claim 14 further comprising:

utilizing the model to provide, in association with prompting the select user to input a response, the predicted suggested responses for each of the identified one or more interactive elements; and receiving a selection of one or more of the predicted suggested responses as the at least one response.

16. One or more non-transitory computer-readable storage media having computer-executable instructions embodied thereon, wherein when executed by at least one processor of a video accessibility computing system in communication with at least one memory device, the computer-executable instructions cause the at least one processor to:

generate and display a user interface including one or more data entry fields for input, by a select user, of parts of an interactive video;

receive, via the one or more data entry fields, a video executable file as one part of the interactive video;

scan the video executable file;

identify one or more interactive elements in the video executable file, wherein the one or more interactive elements includes one or more locations within the interactive video at which at least one question is configured to be presented to a viewer of the interactive video;

receive, via the one or more data entry fields, at least one response input by the select user to the at least one question;

convert the at least one response into at least one executable code snippet;

create an enhanced video executable file by embedding the at least one executable code snippet into the video executable file for execution at a designated time; and store the enhanced video executable file in the at least one memory device to be accessible by a viewer device, wherein the enhanced video executable file is configured to be executed by the viewer device in association with playback of the interactive video and, when executed by the viewer device, causes at least the at least one response to be presented by the viewer device to the viewer of the interactive video in an output format specific to the viewer.

17. The computer-readable storage media of claim 16, wherein the enhanced video executable file includes instructions that, when executed by the viewer device including an accessibility extension that includes a screen reader, cause the screen reader of the viewer device to at least one of (i) read aloud, in association with an audible output associated with the output format or (ii) translate to braille, in association with a tactile output associated with the output format, the at least one response to the viewer of the viewer device, wherein the reading aloud or the translating to braille the at least one response is associated with a disability of the viewer.

18. The computer-readable storage media of claim 17, wherein the video executable file includes interactive element data and a timestamp associated with the interactive element data, wherein the interactive element data is associated with the one or more interactive elements.

19. The computer-readable storage media of claim 18, wherein the computer-executable instructions further cause the at least one processor to:

match the at least one response with the timestamp of each interactive element of the one or more interactive elements to create the enhanced video executable file, wherein the enhanced video executable file further includes instructions that, when executed by the viewer device, cause the viewer device to at least one of (i) read aloud, in association with the audible output or (ii) translate to braille, in association with the tactile output, the at least one response at each timestamp.

20. The computer-readable storage media of claim 19, wherein the computer-executable instructions further cause the at least one processor to:

receive, from the viewer device, viewer responses for each interactive element; and move to a section of the enhanced video executable file linked to the viewer responses for each interactive element such that the enhanced video executable file is customized for the viewer based upon the viewer responses.

* * * * *